United States Patent
Welsh et al.

(10) Patent No.: US 12,415,220 B2
(45) Date of Patent: Sep. 16, 2025

(54) TOOLING ASSEMBLIES FOR LATHE MACHINES, CNC THREADING LATHES, AND METHODS OF MILLING THREADS IN TUBULAR WORKPIECES

(71) Applicant: Amera-Seiki Direct, LLC, Cedar Rapids, IA (US)

(72) Inventors: Richard Allen Welsh, Cedar Rapids, IA (US); James Bren Legg, Magnolia, TX (US); James Robert Roy, Magnolia, TX (US)

(73) Assignee: Amera-Seiki, Inc., Houston, TX (US)

( * ) Notice: Subject to any disclaimer, the term of this patent is extended or adjusted under 35 U.S.C. 154(b) by 0 days.

(21) Appl. No.: 18/133,586

(22) Filed: Apr. 12, 2023

(65) Prior Publication Data
US 2023/0241688 A1    Aug. 3, 2023

Related U.S. Application Data

(63) Continuation of application No. 15/993,286, filed on May 30, 2018, now Pat. No. 11,660,677.

(51) Int. Cl.
*B23G 1/32*      (2006.01)
*B23B 1/00*      (2006.01)
(Continued)

(52) U.S. Cl.
CPC .............. *B23B 3/065* (2013.01); *B23B 3/162* (2013.01); *B23G 1/32* (2013.01); *B23Q 39/024* (2013.01);
(Continued)

(58) Field of Classification Search
CPC . Y10T 409/300672; Y10T 409/300728; Y10T 409/300784; Y10T 409/300112; B23G 1/34; B23G 1/32; B23G 2240/36
(Continued)

(56) References Cited

U.S. PATENT DOCUMENTS 1,361,098 A * 12/1920 Richards .................. B23G 1/32
                                                            409/73
2,191,777 A *  2/1940 Stone ....................... B23G 1/34
                                                            409/66
(Continued)

FOREIGN PATENT DOCUMENTS

CN      203610964 U    5/2014
CN      205702588 U    11/2016
(Continued)

OTHER PUBLICATIONS

Wikipedia article from https://en.wikipedia.org/wiki/Wikipedia:Wikipedia_is_not_a_reliable_source#:~:text=Wikipedia%20is%20not%20a%20reliable%20source%20for%20citations%20elsewhere%20on,in%20progress%2C%20or%20simply%20incorrect, titled "Wikipedia: Wikipedia is not a reliable source", downloaded on Dec. 10, 2024.*

(Continued)

*Primary Examiner* — Erica E Cadugan
(74) *Attorney, Agent, or Firm* — Troutman Pepper Locke LLP; Daniel G. Nguyen; Emma Bennett (57) ABSTRACT

A tooling assembly for a lathe machine includes a tool platform configured to be mounted on the lathe machine, a milling tool holder fixedly secured to the tool platform and workable to releasably secure a thread milling tool therein, and a milling tool drive. The milling tool drive is operatively connected to the milling tool holder and operable to rotate the milling tool holder independently of a work holder to mill threads on the workpiece when a pipe thread milling tool is secured in the milling tool holder. Computer numerical control threading lathes and methods of milling threads in tubular workpieces are also described.

6 Claims, 12 Drawing Sheets

(51) Int. Cl.
- B23B 3/06 (2006.01)
- B23B 3/16 (2006.01)
- B23Q 39/02 (2006.01)
- B23B 11/00 (2006.01)
- B23P 23/02 (2006.01)
- B23Q 39/00 (2006.01)

(52) U.S. Cl.
CPC .......... *B23G 2240/36* (2013.01); *B23P 23/02* (2013.01); *B23Q 2039/004* (2013.01); *B23Q 2039/008* (2013.01); *Y10T 29/5114* (2015.01); *Y10T 409/300504* (2015.01); *Y10T 409/300672* (2015.01)

(58) Field of Classification Search
USPC .......................................... 409/76, 77, 78, 66
See application file for complete search history.

(56) References Cited

U.S. PATENT DOCUMENTS

| | | | | |
|---|---|---|---|---|
| 2,526,762 | A * | 10/1950 | Miller | B23B 5/163 409/71 |
| 2,641,287 | A * | 6/1953 | Keys | B23B 29/12 409/76 |
| 2,776,604 | A * | 1/1957 | Simsack | B23C 7/00 409/77 |
| 3,119,210 | A | 1/1964 | Doeden | |
| 3,691,879 | A | 9/1972 | Blake | |
| 3,704,648 | A | 12/1972 | Burfoot | |
| 3,738,226 | A * | 6/1973 | Dickerson | B23G 1/32 409/77 |
| 4,034,646 | A | 7/1977 | Dahlin | |
| 4,182,205 | A | 1/1980 | Baker | |
| 4,278,374 | A | 7/1981 | Wolosianski | |
| 4,571,796 | A | 2/1986 | Sellner et al. | |
| 4,606,683 | A | 8/1986 | Link et al. | |
| 4,616,322 | A | 10/1986 | Niwa | |
| 4,704,773 | A | 11/1987 | Quinart | |
| 4,777,713 | A | 10/1988 | Kitamura | |
| 4,843,691 | A | 7/1989 | Hafla | |
| 5,031,490 | A | 7/1991 | Grossmann | |
| 5,093,972 | A | 3/1992 | Kaku | |
| 5,214,829 | A | 6/1993 | Minagawa | |
| 5,568,028 | A | 10/1996 | Uchiyama | |
| 6,298,758 | B1 | 10/2001 | Wu | |
| 11,660,677 | B2 * | 5/2023 | Welsh | B23B 3/162 409/218 |
| 2004/0081519 | A1 | 4/2004 | Gainer | |
| 2006/0120819 | A1 | 6/2006 | Honegger et al. | |
| 2008/0131224 | A1 | 6/2008 | Vouillamoz | |
| 2014/0245870 | A1 | 9/2014 | Walz | |
| 2016/0256932 | A1 | 9/2016 | Theurillat | |

FOREIGN PATENT DOCUMENTS

| | | |
|---|---|---|
| DE | 10104181 A1 | 8/2002 |
| EP | 0067882 A1 | 12/1981 |
| EP | 1366842 A1 | 12/2003 |
| KR | 870002069 B1 | 12/1987 |
| KR | 20110120789 A | 11/2011 |
| KR | 101236557 B1 | 2/2013 |
| KR | 20160109000 A | 9/2016 |
| WO | 2015154634 A1 | 10/2015 |
| WO | 2016144037 A1 | 9/2016 |

OTHER PUBLICATIONS

USPC (United Stated Patent Classification) Class 29 Schedule, Mar. 2012, 16 pages.*
USPC (United Stated Patent Classification) Class 29 Definitions, Mar. 2012, 195 pages.*
"Thread Milling vs Tapping: Advantages & Disadvantages," SANS Machining, retrieved Sep. 12, 2022 from the Internet at https://www.sansmachining.com/thread-milling-vs-tapping-advantages-disadvantages.
"The Advantage of Thread Milling," SmiCut AB, retrieved Sep. 12, 2022 from the Internet at http://smicut.com/wp-content/uploads/The-Advantage-of-Thread-Milling480p.mp4.
English Translation of WO 2016144037 A1 (Year: 2016).
Machine Translation of DE 10104181-A1, which DE '181 was published Aug. 2002.
Machine Translation of EP 1366842 A1, which EP '842 was published Dec. 2003.
Machine Translation of WO 2015/154634, which WO '634 was published Oct. 2015.
Machine Translation of WO 2016/144037, which WO '037 was published Sep. 2016.
The Whirling Process for Internal Threads (Year: 2005).
Written Opinion and Search Report dated Sep. 18, 2019 for PCT Application No. PCT/US2019/034109.

* cited by examiner

TOOLING ASSEMBLIES FOR LATHE MACHINES, CNC THREADING LATHES, AND METHODS OF MILLING THREADS IN TUBULAR WORKPIECES

CROSS-REFERENCE TO RELATED APPLICATIONS

This application is a continuation of U.S. application Ser. No. 15/993,286, entitled "TOOLING ASSEMBLIES FOR LATHE MACHINES, CNC THREADING LATHES, AND METHODS OF MILLING THREADS IN TUBULAR WORKPIECES," filed May 30, 2018, which is incorporated herein by reference in its entirety.

BACKGROUND OF THE INVENTION

1. Field of the Invention

The present disclosure relates to milling threads on tubular workpieces, and more particularly to milling threads on pipes and couplings for use in oil and gas wells using lathes.

2. Description of Related Art

Threaded pipes and couplings are commonly used to conveying various types of fluids, for example in oil and gas production. The threads are typically cut such that a fluid-tight connection can be established and maintained during service, male threads generally being cut into the exterior surface of the pipe and female threads cut into the interior surface of the coupling to form a threaded connection. The male and female threads are typically cut with precision sufficient to limit the risk of leakage and/or failure under the downhole conditions, such as when the connection is exposed the high fluid pressures required in fracking operations.

Cutting threads in pipes and couplings generally entails employing a turning operation. The pipe or coupling is typically seated in a lathe and rotated relative to a cutting tool. While the pipe or coupling rotates the cutting tool is pressed against the pipe or coupling surface such that a surface of the cutting tool removes an elongated, wire-like chip from the pipe or coupling. The cutting tool may be advanced relative to the rotating pipe or coupling to define the desired helical pitch of the threads.

One challenge to cutting threads using turning operations is managing the wire-like chips cut from the workpiece during thread-cutting. During male thread-cutting the wire-like chips can form a mass, i.e., a bird nest, on the exterior of the pipe or coupling and carried by the rotating pipe or coupling. During female thread cutting the wire-like chips can aggregate as a mass within the interior of the pipe or coupling to form a birds nest. In either case the bird nest can require clearance, typically through operator intervention, such as by the lathe operator using a metal hook to clear or remove the bird nest. In these cases, the bird nest is often cleared while the lathe is still in operation, which poses serious safety risks as the cutting tool continues to rotate in proximity to the worker's metal hook. Alternatively, the lathe may be stopped to clear the bird nest obstruction. However, stopping operation for each bird nest also severely slows the production time, particularly when threading the countless coupling/pipe needed for the oil and gas industry. As will be appreciated, the wire-like chips forming the bird nest can pose a hazard to the operator due to sharp edges and spring action of the wire-like chips. The wire-like chips can also present a hazard to threads cut into pipe or coupling, movement of the birds nest across the threads tending to damage the freshly cut threads.

Various tools and techniques have been developed in efforts to manage the wire-like chips formed during turning. For example, chip breaker devices have been developed to break the wire-like chips as they form, generally to limited effect. Turning speed and/or feed rate adjustments have also been attempted, also with limited effect. Bird nest formation remains common in turning operations and is generally considered unavoidable during thread-cutting.

Such conventional methods and systems for cutting threads in pipes and couplings using turning operations have generally been considered satisfactory for their intended purpose. However, there is still a need in the art for improved methods and systems for cutting threads in pipes and couplings. The present disclosure provides a solution for this need.

SUMMARY

A tooling assembly for a lathe machine includes a tool platform, a milling tool holder, and a milling tool drive. The tool platform is configured to be mounted on the lathe machine. The milling tool holder is fixedly secured to the tool platform and is workable to releasably secure a thread milling tool therein. The milling tool drive is operatively connected to the milling tool holder and is operable to rotate the milling tool holder independently of a work holder to mill threads on the workpiece when a pipe thread milling tool is secured in the milling tool holder.

In certain embodiments a static tool holder can be mounted on the tool platform. The static tool holder can mounted to the on the tool platform at a location offset from the milling tool holder. A thread milling tool can be supported for rotation relative to the tool platform by the milling tool holder. A static tool can be fixedly secured to the tool platform. The static tool can be coupled to the tool platform by the static tool holder.

In accordance with certain embodiments, a mill spindle can be fixed in rotation relative the milling tool holder. A spindle housing can be fixed to the tool platform and rotatably support the milling tool holder. A milling tool drive can be operatively connected to the milling tool holder and supported by the tool platform. A milling tool drive bracket can couple the milling tool drive to the tool platform. An adapter plate can couple the milling tool drive to the tool platform. A motor cam and a spindle cam interconnected by a mill drive belt can operably connect the milling tool drive to the mill too holder.

A computer numerical control (CNC) threading lathe includes a base defining a z-axis and an x-axis angled and movable relative to the z-axis, a work holder rotatable relative to the base, and a tooling assembly as described above. The tooling assembly is movable relative to the work holder along the z-axis. The tool platform of the tooling assembly is movable along the x-axis between a thread milling position and a turning position. The thread milling position is selected to position a thread milling tool rotatably supported by the tool platform against a tubular workpiece supported by the work holder. The turning position is selected to position a static tool fixedly supported by the tool platform against the tubular workpiece supported by the work holder.

In certain embodiments a thread milling tool can be supported for rotation by the milling tool holder and a static tool fixedly secured to the tool platform. A milling tool drive can be operatively connected to the milling tool holder. The milling tool drive can be supported by the tool platform. A milling tool drive bracket can couple the milling tool drive to the tool platform. An intervening adapter plate can couple the milling tool drive to the tool platform. A tubular workpiece, such as a pipe or coupling, can be supported for rotation in the work holder.

In accordance with certain embodiments a work beam can be movable along the z-axis of the CNC threading lathe. A spindle motor can be fixed relative to the work beam. A beam spindle can couple the spindle motor to the tool platform for moving the tool platform along the x-axis between a milling position and a turning position. The milling position and the turning position can both be disposed along a x-axis of the CNC threading lathe. A beam spindle can be operably connected to the work beam for moving the work beam along the z-axis of the CNC threading lathe.

It is contemplated that, in certain embodiments, the CNC threading lathe can include a controller. The controller can be disposed in communication with a non-transitory machine readable medium having instructions recorded thereon that, when read by the controller, cause the controller to rotate a tubular workpiece supported in the work holder, rotate a thread milling tool supported in the milling tool holder, and mill threads on the tubular workpiece with the thread milling tool. The threads can be milled by rotating the thread milling tool independently of rotation of the workpiece during milling of the threads on the workpiece.

A method of milling threads on a workpiece using a CNC threading lathe includes rotating a workpiece supported in a work holder, rotating a thread milling tool supported in a milling tool holder independently of the workpiece supported in the work holder, and milling threads in the workpiece in a milling operation using the thread milling tool while rotating the workpiece supported in the work holder.

In certain embodiments the tool platform can be moved between the milling position and the turning position and material removed from the tubular workpiece in a turning operation following the milling operation. The tubular workpiece can remain in the workpiece holder between the beginning of the thread milling operation and the end of the turning operation. In certain embodiments, moving the tool platform between the milling position and the turning position includes moving the tool platform in a rotary movement.

These and other features of the systems and methods of the subject disclosure will become more readily apparent to those skilled in the art from the following detailed description of the preferred embodiments taken in conjunction with the drawings.

BRIEF DESCRIPTION OF DRAWINGS

So that those skilled in the art to which the subject disclosure appertains will readily understand how to make and use the devices and methods of the subject disclosure without undue experimentation, preferred embodiments thereof will be described in detail herein below with reference to certain figures.

DETAILED DESCRIPTION OF PREFERRED EMBODIMENTS

Figure 2:
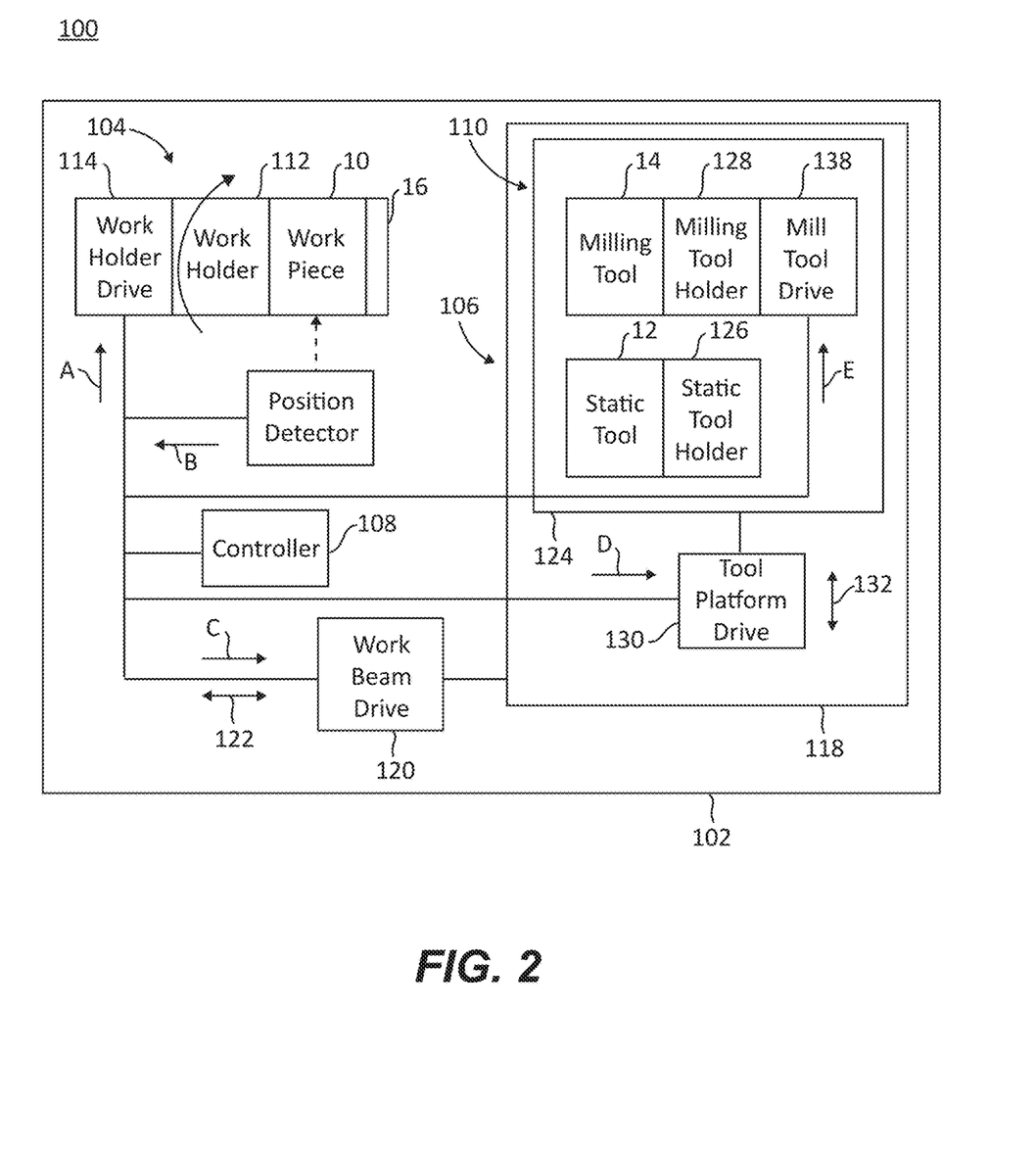
FIG. 2 is a schematic view of a threading lathe according to the present disclosure, showing a controller operatively connected to a tool assembly, the tool assembly having both a static tool and a thread milling tool.

Reference will now be made to the drawings wherein like reference numerals identify similar structural features or aspects of the subject disclosure. For purposes of explanation and illustration, and not limitation, a partial view of an exemplary embodiment of a tooling assembly for a threading lathe in accordance with the disclosure is shown in FIG. 2 and is designated generally by reference character 110. Other embodiments of tooling assemblies, threading lathes, and methods of milling threads on tubular workpieces in accordance with the disclosure, or aspects thereof, are provided in FIGS. 3-12, as will be described. The systems and methods described herein can be used for milling threads and on tubular workpieces, such as couplings and pipes for oil and gas wells, though the present disclosure is not limited to pipes and couplings for oil and gas wells nor to pipes and couplings in general.

Illustrative embodiments of the present disclosure are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. The terms "couple" or "couples" as used herein are intended to mean either an indirect or a direct connection.

There is a need for tooling assemblies, computer numerical controlled (CNC) threading lathes, and methods of milling threads on workpieces such as pipes and couplings that reduce (or eliminated entirely) the wire-like chips commonly generated during thread-cutting which aggregate as birds nest about the workpiece exterior or within the workpiece. The present disclosure recognizes and addresses this need. For example, the present systems and methods allow for cutting threads on couplings and pipes for use in oil and gas production operations without creating the long, wire-like chips that can otherwise require containment and/or may form bird nests requiring clearance from within the interior of a pipe or coupling.

Figure 1:
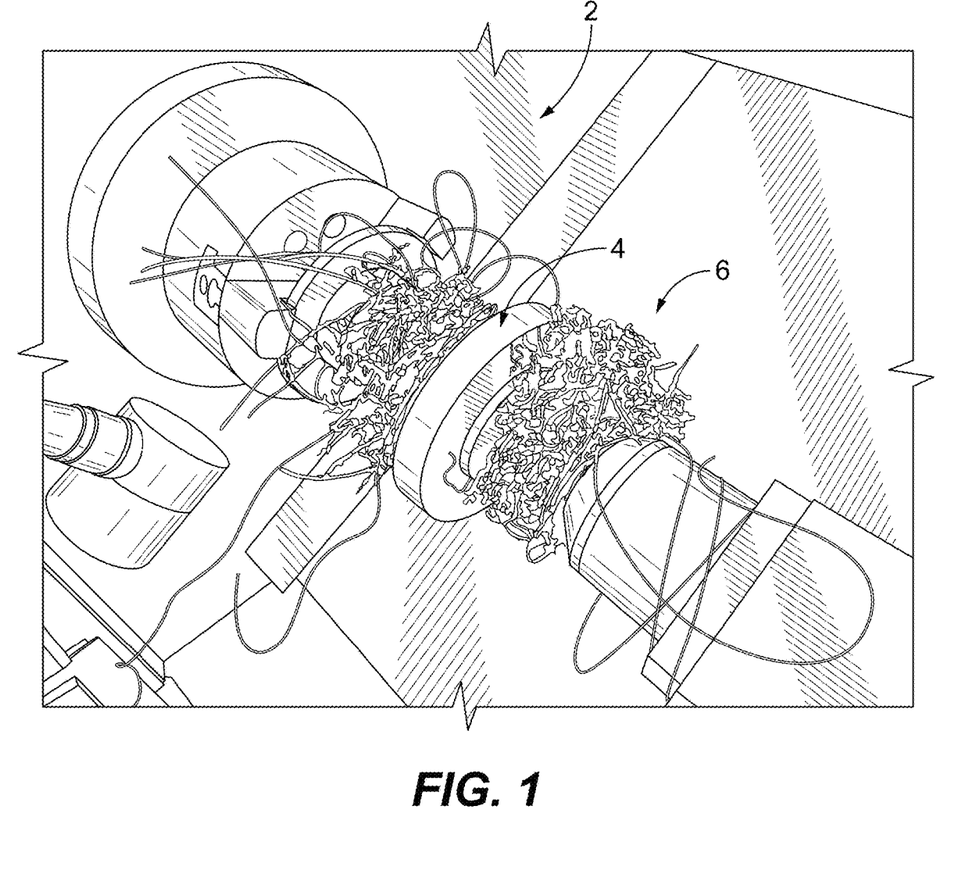
FIG. 1 is a perspective view of lathe, showing a workpiece with a bird nest formed from wire-like chips cut from the workpiece using a turning operation.

Referring the FIG. 1, a lathe 2 is shown. Lathe 2 has a workpiece 4 seated within the lathe chuck and is shown subsequent to removing material from workpiece 4 using a turning operation. The material contains long, wire-like chips which have aggregated as a mass about workpiece 4 as a birds nest 6. Birds nest 6 requires clearance prior to the next turning operation.

Referring to FIG. 2 a threading lathe 100, e.g., a lathe machine, is shown. Threading lathe 100 has a base 102, a work holder assembly 104, a work beam assembly 106, a controller 108, and a tooling assembly 110. Work holder assembly 104 includes a work holder 112 and a work holder drive 114. Work holder 112 is configured support a workpiece 10, e.g., a coupling or a pipe, for rotation relative to base 102. Work holder drive 114 is to disposed in communication with controller 108 and is operably connected to work holder 112, and thereby to a workpiece 10 supported therein, for rotating workpiece 10 relative to base 102. Rotation is according to a work holder drive signal A received from controller 108. It is contemplated that threading lathe 100 can be a computer numerical control (CNC) threading lathe, controller 108 configured to operate threading lathe 100 in an autonomous or semi-autonomous mode.

A work holder position detector 116 is disposed in communication with work holder assembly 104 to generate a work holder position signal B and controller 108. It is contemplated that work holder position detector 116 generate a work holder position signal B, which work holder position detector 116 provides to controller 108 for controlling position of work holder 112 during milling of threads 16 on workpiece 10. It is contemplated that work holder position signal B be suitable such that controller 108 provide c-axis control of work holder assembly 104, positional control of work holder 112 being on the order of about 0.001 degrees in certain embodiments.

Work beam assembly 106 includes a work beam 118 and a work beam drive 120. Work beam 118 is slideably supported by base 102 for movement relative to base 102 along a z-axis 122. Work beam drive 120 is operably coupled to work beam 118 and is disposed in communication with controller 108 to move work beam 118 along z-axis 122 relative to base 102 according a work beam drive signal C, which controller 108 generates and provides to work beam drive 120.

Tooling assembly 110 includes a tool platform 124, a static tool holder 126, a milling tool holder 128, and a tool platform drive 130. Static tool holder 126 is fixed relative to tool platform 124 and is configured to support a static tool 12, e.g., a lathe tool or a turning tool. Milling tool holder 128 is supported for rotation relative to tool platform 124 and is configured to rotatably support a thread milling tool 14. A milling tool drive 138 is operably connected to milling tool holder 128 and is configured for rotating milling tool holder 128, and thereby rotating thread milling tool 14, according to a milling tool drive signal E received from controller 108. Milling tool drive signal E is generated by controller 108 and provided to milling tool drive 138 when thread milling tool 14 is positioned against workpiece 10.

Tool platform drive 130 is operably connected to tooling assembly 110 for moving tooling assembly 110 between a turning position 260 (shown in FIG. 10), wherein static tool 12 is positioned against workpiece 10 for removing material from the exterior of workpiece 10, and a milling position 262 (shown in FIG. 11), wherein thread milling tool 14 is positioned against workpiece 10 for cutting threads in the surface of workpiece 10. Movement between turning position 260 and milling position 262 is according to a tooling assembly drive signal D, which controller 108 generates and which tool platform drive 130 receives from controller 108. Movement between turning position 260 and milling position 262 is in a linear movement along at least one of z-axis 122 and x-axis 132. In certain embodiments, moving the tool platform between the milling position and the turning position includes moving the tool platform in a rotary movement.

As will be appreciated by those of skill in the art in view of the present disclosure, positioning static tool 12 against workpiece 10 allows for removing material from workpiece 10 in a turning operation. For example, an inner diameter of pipe or coupling workpiece can be finished by positioning static tool 12 against the pipe or coupling workpiece while rotating the workpiece at a turning speed. As will also be appreciated by those of skill in the art in view of the present disclosure, positioning thread milling tool 14 against workpiece 10 allows for milling threads 16 in a surface of workpiece 10 by rotating the workpiece at a milling speed, rotation of thread milling tool 14 breaking chips generated by the milling operation and preventing formation of a birds nest on workpiece 10. As will be appreciated by those of skill in the art, this reduces (or eliminates entirely) the need to clear such hazards during workpiece threading, improving efficiency and/or reducing (or eliminating entirely) the hazard that clearing the birds nest from the workpiece. Advantageously, both the turning operation and the milling operation can be performed without removing workpiece 10 from work holder 112, reducing cycle time to finish inner/outer surfaces, bevel the workpiece end, and cut threads in workpiece 10.

Figure 3:
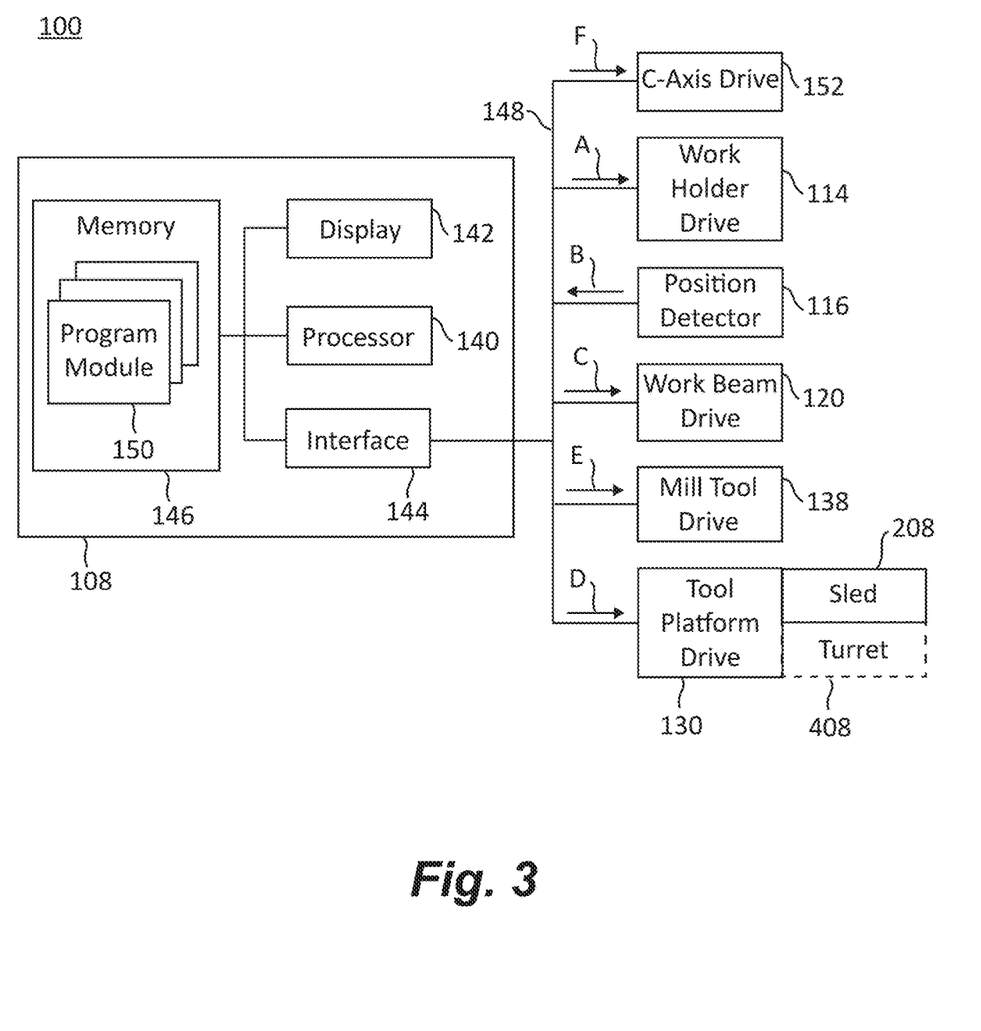
FIG. 3 is a schematic view of the threading lathe of FIG. 2, showing a controller operatively connected to the tool platform for moving the tool assembly and positioning the static tool or the thread milling tool to against a workpiece supported for rotation relative to the threading lathe.

With reference to FIG. 3 controller 108 is shown. Controller 108 includes a processor 140, a user interface 142 (e.g. a display and/or a keypad), a network interface 144, and a memory 146. User interface 142 allows for a user control threading lathe 100. Network interface 144 provides communication between controller 108 and work holder drive 114, work holder position detector 116, work beam drive 120, milling tool drive 138, tool platform drive 130, and c-axis drive 152. Communication occurs over a link 148 coupling work holder drive 114, work holder position detector 116, work beam drive 120, milling tool drive 138, tool platform drive 130, and c-axis drive 152 with controller 108. It is contemplated that link 148 can be wired and/or wireless, as suitable for an intended application, to pass therethrough work holder drive signal A, work holder position signal B, work beam drive signal C, tooling assembly drive signal D, mill drive signal E, and c-axis drive signal F.

Memory 146 includes a non-transitory machine readable memory with a plurality of program modules 150 recorded thereon that, when read by processor 140, cause processor 140 to execute certain operations. In this respect it is contemplated that the instructions recorded in the plurality of program modules 150 cause processor 140 to execute the operations of a method of milling threads on a workpiece, e.g., a method 300 of milling threads on a workpiece using a CNC lathe machine (shown in FIG. 12), as will be described. While shown in FIG. 2 as a controller having a single processor 140 and memory 146 it is to be understood and appreciated that controller 108 can include circuitry, software, or a combination of circuitry and software, as suitable for an intended application.

Figure 4:
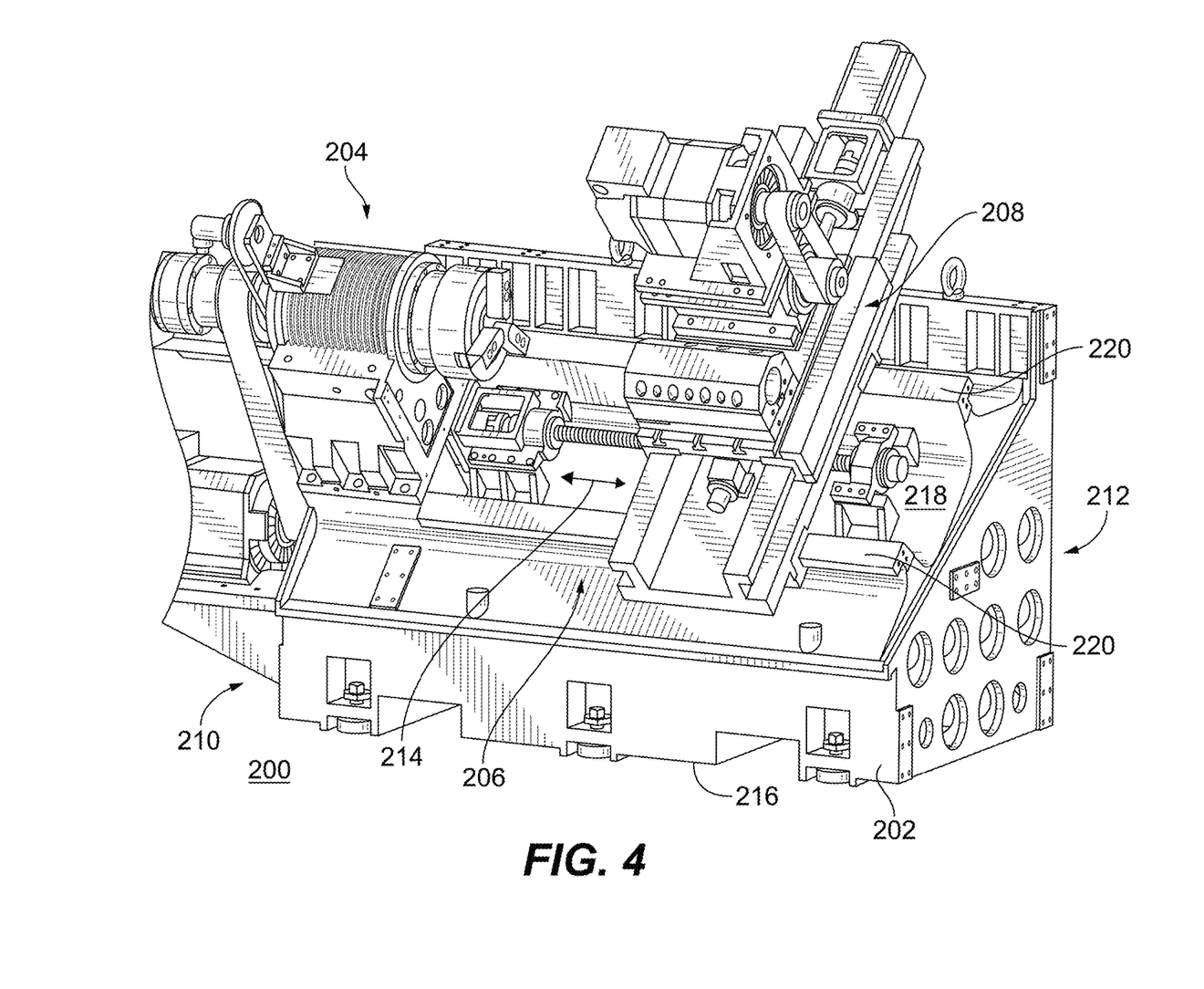
FIG. 4 is a perspective view of an exemplary embodiment of a threading lathe, showing a tooling assembly supported for movement along a work beam along an x-axis, the tooling assembly movable with the work beam along a z-axis.

With reference to FIG. 4, a threading lathe 200 is shown according an exemplary embodiment. Threading lathe 200 includes a base 202, a work holder assembly 204, a work beam assembly 207, and tooling assembly 208. Base 202 extends between a work holder end 210 and an tooling assembly end 212, defines a z-axis 214, and has a bottom 216 and bed 218. Bed 218 is angled relative to bottom 216. In this respect, from the perspective of work holder end 210 or tooling assembly end 212, bed 218 and bottom 216 define between one another an angle. The angle can be a 45-degree angle. The angle can be less than 45-degrees. The angle can be more than 45-degrees. It is also contemplated that, in certain embodiments, bed 218 can be substantially parallel to bottom 216, as suitable for an intended application. Although threading lathe 200 is shown and described as a horizontal lathe 200 wherein bed 218 is arranged above bottom 216 relative to gravity, it is to be understood and appreciated that vertical lathes can also benefit from the present disclosure. Examples of suitable threading lathes include Amera-Seiki® "Top Turn" series CNC lathes, available from Amera-Seiki, Inc. of Houston, Texas.

Two z-rails 220 extend longitudinally along bed 216 between work holder end 210 and tooling assembly end 212. The two z-rails 220 are each substantially parallel to z-axis 214 and are configured to slideably support work beam assembly 207 for movement along z-axis 214 relative to work holder assembly 204. Although two z-rails 220 are shown in the illustrated exemplary embodiment it is to be understood and appreciated that threading lathe 200 can have fewer than two z-rails 220 or more than two z-rails 220, as suitable for an intended application.

Figure 5:
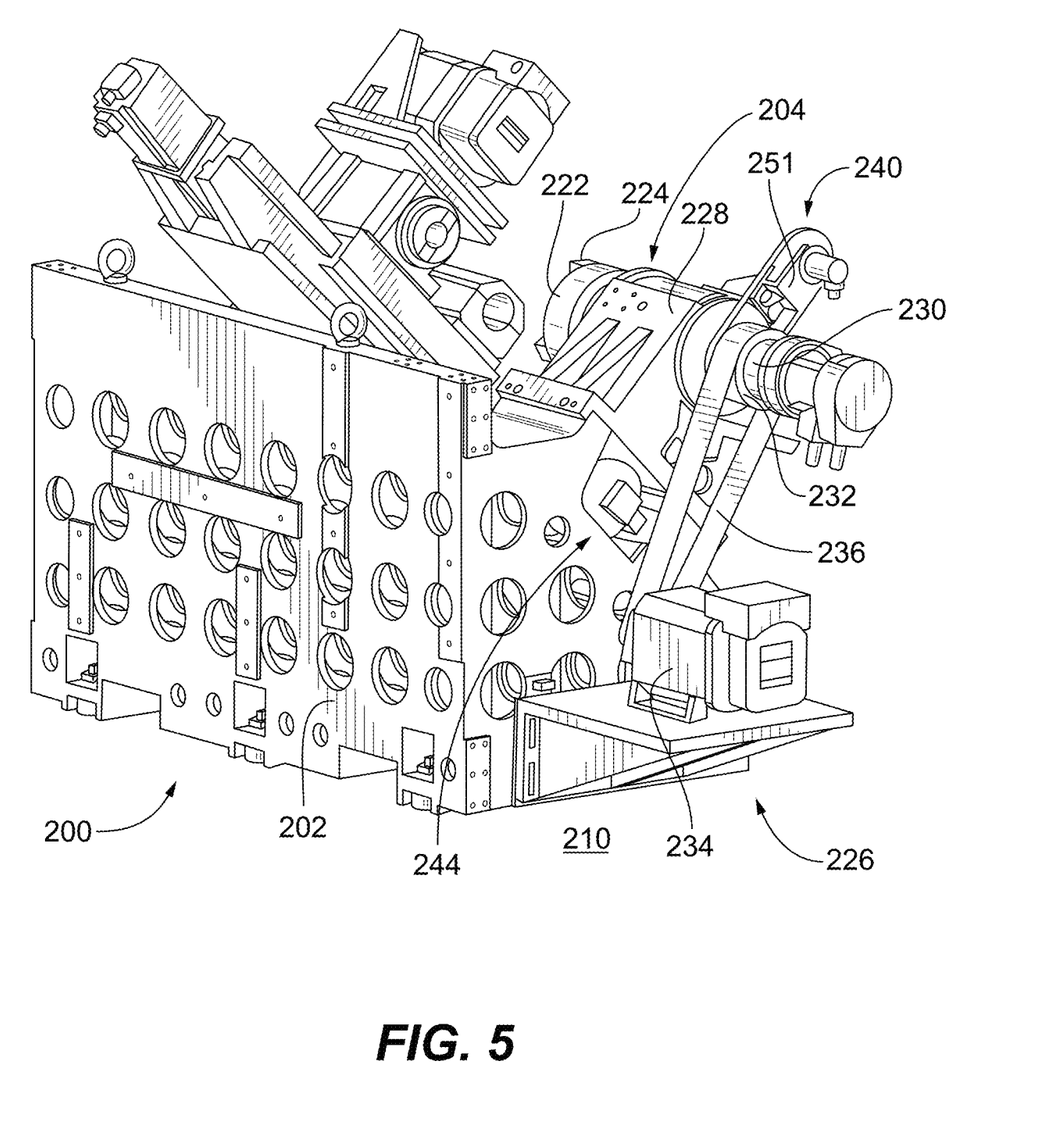
FIG. 5 is a perspective view of the threading lathe of FIG. 4, showing a drive end of the threading lathe including a work holder drive and a work holder position detector for c-axis control of the work holder.

With reference to FIG. 5, work holder end 210 of threading lathe 200 is shown. Work holder assembly 204 is configured to support workpiece 10 (shown in FIG. 2) for rotation relative to base 202. In this respect work holder assembly 204 includes a work holder 222 with a plurality of chuck teeth 224 and a work holder drive 226. Work holder 222 is fixed in rotation relative to a work holder spindle 230 and a work holder pulley 232, which are both supported for rotation by a work holder mount 228. Work holder mount 228 is in turn fixed relative to base 202 for supporting work holder 222 and the associated assembly.

Work holder drive 226 includes a work holder drive motor 234 and work holder drive belt 236. Work holder drive belt 236 operably connects work holder drive motor 234 to work holder 222 via work holder drive pulley 232 such that, responsive to work holder drive signal A (shown in FIG. 2), work holder 222 rotates in concert with a rotor portion of work holder drive motor 234. As will be appreciated by those of skill in the art in view of the present disclosure, other types of work holder drive arrangements are contemplated within and are within the scope of the present disclosure, such gear or drive chain arrangements.

A work holder position detector 240 is disposed in communication with work holder 222. Work holder position detector 240 is configured to generate work holder position signal B (shown in FIG. 2), which work holder position detector 240 provides to controller 108 (shown in FIG. 2) for purpose of providing c-axis control of work holder 222. In the illustrated exemplary embodiment work holder position detector 240 includes an encoder/resolver arrangement connected to work holder mount 228 by a bracket 251. This is for illustration purposes only and is non-limiting and, as will be appreciated by those of skill in the art in view of the present disclosure, other types of work holder position detectors can be employed by threading lathe 200 and remain within the scope of the present disclosure.

Figure 6:
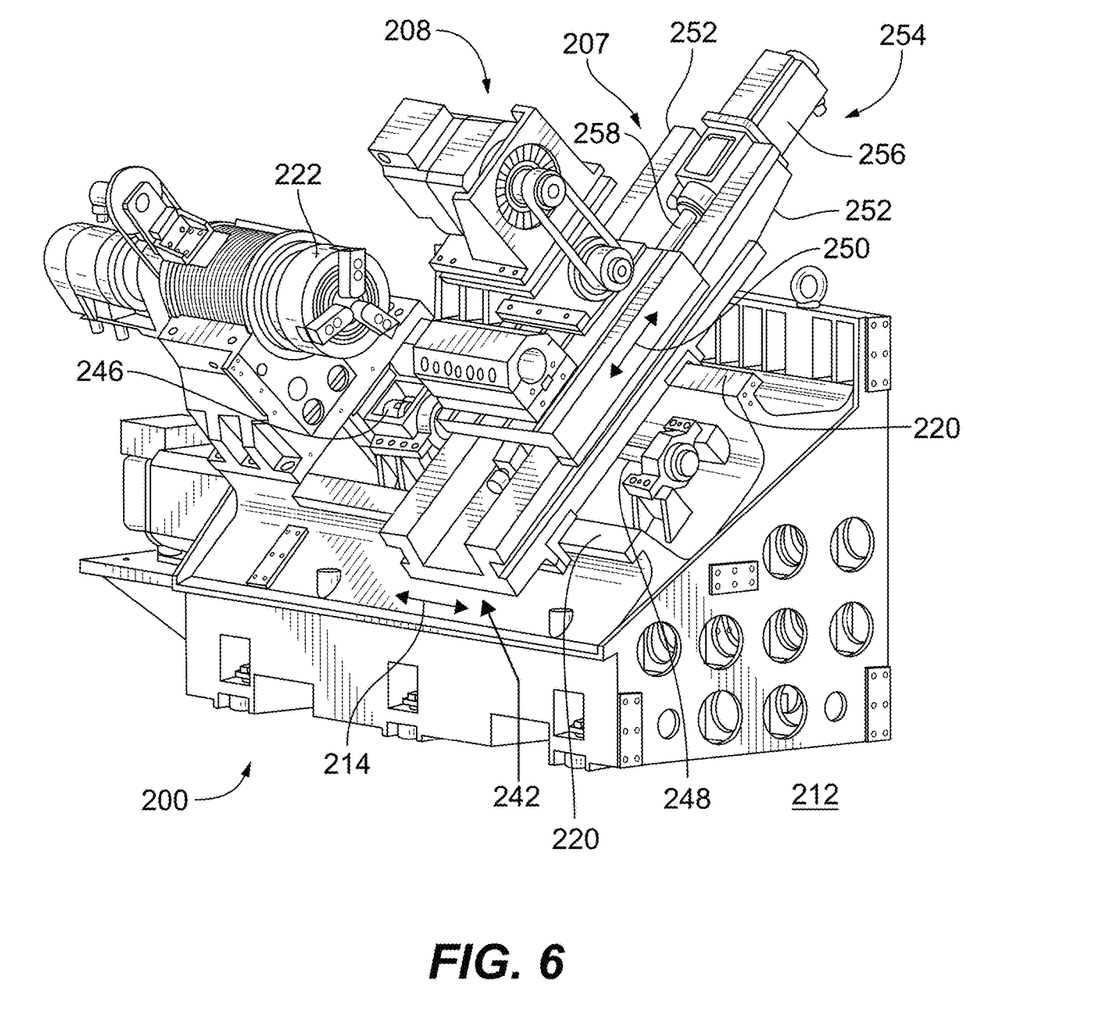
FIG. 6 is a perspective view of the threading lathe of FIG. 4, showing the supporting the work beam on z-rails and work beam supporting the tooling assembly on x-rails for movement of the tooling assembly along the x-axis and the z-axis, respectively.

With reference to FIG. 6, tooling assembly end 212 of threading lathe 200 is shown. Tooling assembly end 212 includes work beam assembly 207, which has a work beam 242 and a work beam drive 244 (shown in FIG. 5). Work beam 242 is slideably disposed on two z-rails 220 for movement relative to work holder 222 along z-axis 214. In the illustrated exemplary embodiment work beam drive 244 includes a work beam drive motor 246 that is operably connected to work beam 242 by a work beam ball screw 248. It is contemplated that work beam drive motor 246 be responsive to work beam drive signal C (shown in FIG. 2) to move work beam 242 relative to work holder 222 along z-axis 214. As will be appreciated by those of skill in the art in view of the present disclosure, tooling assembly 208 in concert with work beam 242. As will also be appreciated by those of skill in the art in view of the present disclosure, other types of work beam drives can be employed by threading lathe 200 and remain within the scope of the present disclosure.

Work beam 242 defines an x-axis 250 and has a pair of x-rails 252 and a tool platform drive 254. X-rails 252 extend in parallel with x-axis 250 and are fixed relative to work beam 242. Tooling assembly 208 is slideably seated on x-rails 252 for movement relative to work beam 242 along x-axis 250. As will be appreciated by those of skill in the art in view of present disclosure, work beam 242 can include fewer than two x-rails 252 or more than two x-rails 252, as suitable for an intended application.

Tool platform drive 254 is operably connected to tooling assembly 208 and includes a tooling assembly drive motor 256 and tooling assembly ball screw 258 in the illustrated exemplary embodiment. Tooling assembly ball screw 258 connects tooling assembly drive motor 256 to tooling assembly 208 such that, responsive to tooling assembly drive signal D (shown in FIG. 2), tool platform drive 254 moves tooling assembly 208 relative to work beam 242. In this respect tool platform drive 254 is configured to move tooling assembly 208 between a turning position 260 (shown in FIG. 10) relative to work holder 222, wherein static tool 12 is positioned against workpiece 10, and a milling position 262 (shown in FIG. 11) relative to work holder 222, wherein thread milling tool 14 positioned against workpiece 10. In the illustrated exemplary embodiment tooling assembly 208 is configured for movement in a linear displacement between turning position 260 and milling position 262, e.g., as a sled arranged on an incline. It is also contemplated that tooling assembly 208 can be alternatively be mounted in a turret 408 (shown in FIG. 3), tooling assembly 208 moving between turning position 260 and milling position 262 at least in part via a rotary movement by turret 408.

Figure 7:
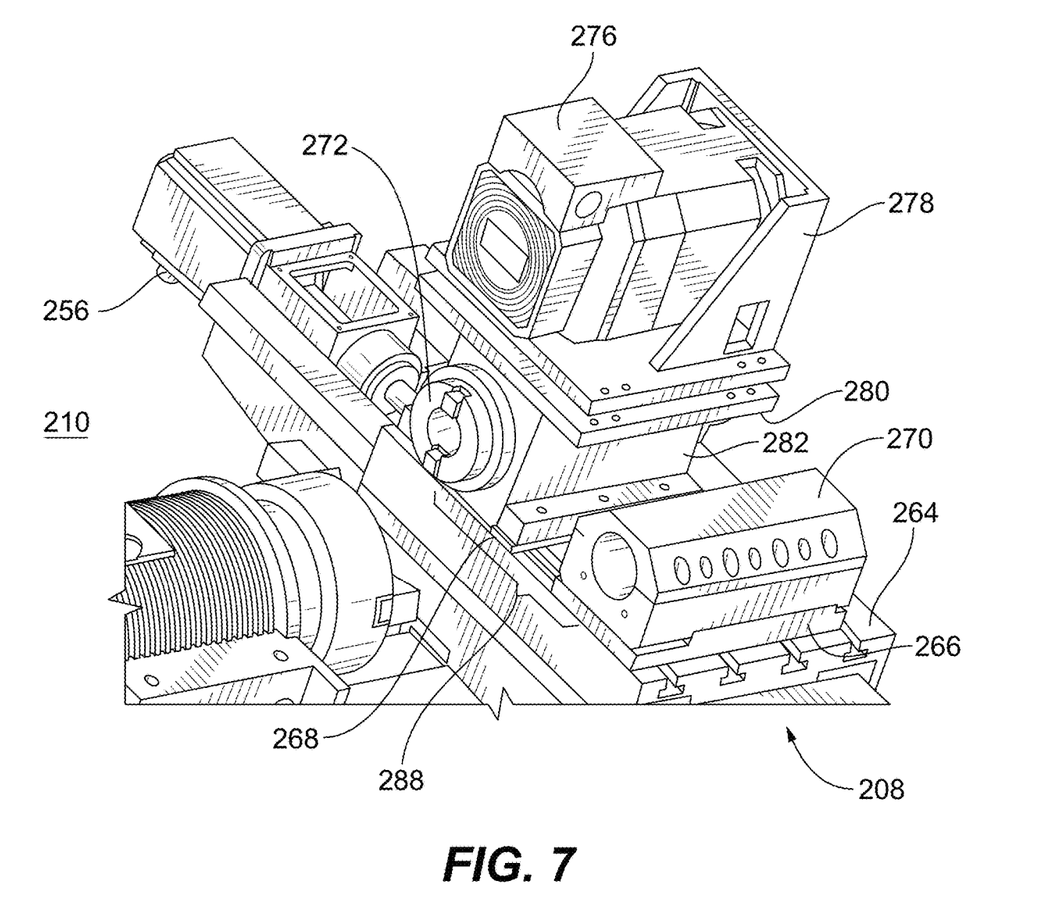
FIGS. 7 and 8 are perspective views of the tooling assembly of FIG. 6, showing a thread milling tool drive carried by the tooling assembly and operably connected to the thread milling tool by a belt and pulley milling tool drive arrangement.
Figure 8:
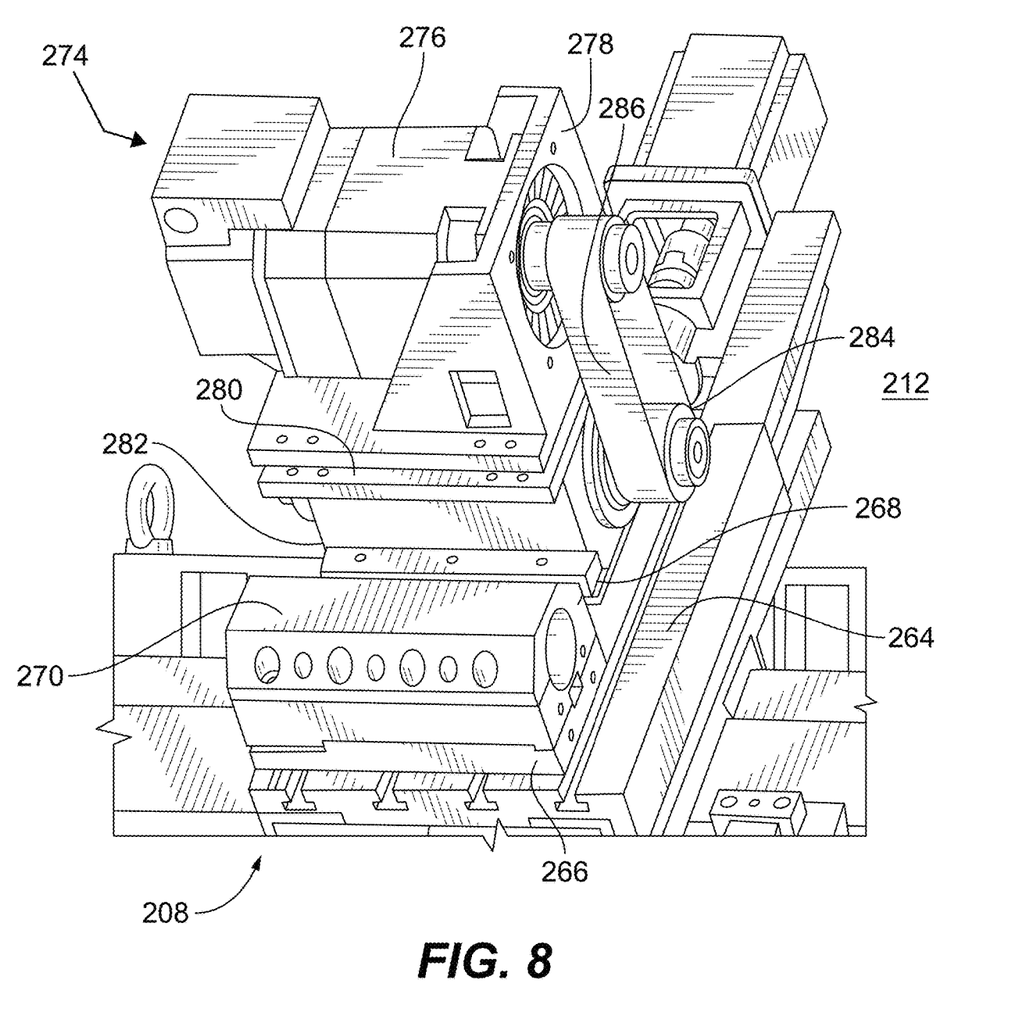

With reference to FIGS. 7 and 8, tooling assembly 208 is shown from work holder end 210 and tooling assembly end 212, respectively. Tooling assembly 208 includes a tool platform 264 with a static tool seat 266 and milling tool seat 268. A static tool holder 270 is fixed to tool platform 264 by static tool seat 266 for supporting static tool 12 (shown in FIG. 2), and a milling tool holder 272 is fixed to tool platform 264 by milling tool seat 268. A milling tool drive 274 is operably connected to milling tool holder 272 for rotating thread milling tool 14 (shown in FIG. 2) relative to workpiece 10 at a speed suitable for milling threads 16 (shown in FIG. 2) in workpiece 10. Milling tool seat 268 is offset from static tool seat 266 along x-axis 250 by an x-axis offset 288 such that one of static tool 12 and thread milling tool 14 are positioned against workpiece 10 during a turning operation or a milling operation for milling threads 16 on workpiece 10.

Milling tool drive 274 includes a milling tool drive motor 276, a direct-drive mounting bracket 278, and a direct-drive adapter plate 280. Milling tool drive motor 276 seats in direct-drive motor mounting bracket 278. Direct-drive motor mounting bracket 278 in turn seats on direct-drive adapter plate 280 to a milling tool holder mount 282, milling tool holder mount 282 supporting milling tool holder 272 for rotation with a milling tool holder pulley 284 (shown in FIG. 8). As shown in FIG. 8, a rotor of milling tool drive motor 276 is coupled to milling tool holder pulley 284 by a milling tool drive belt 286 such that the rotor of milling tool drive motor 276 and milling tool holder 272 (shown in FIG. 7) rotate in concert with one another to mill threads 16 (shown in FIG. 2) in workpiece 10. It is contemplated that milling tool drive motor 276 be response to tooling assembly drive signal D (shown in FIG. 2) for purposes of milling threads 16 in workpiece 10. As will be appreciated by those of skill in the art in view of the present disclosure, the illustrated exemplary direct-drive arrangement allows for the user of a relatively large milling tool drive motor within a relatively small footprint on tool platform 264.

Figure 9:
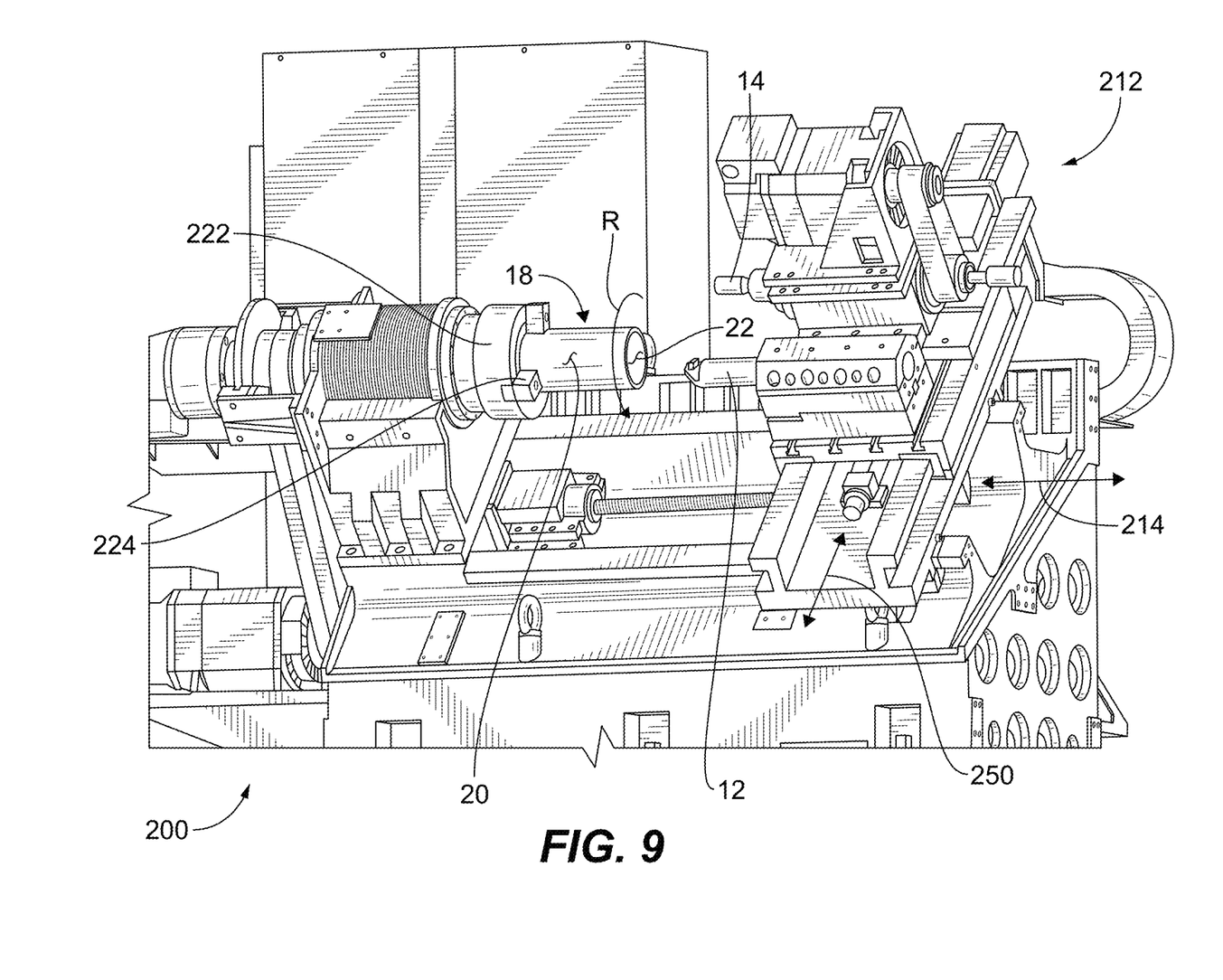
FIG. 9 is a perspective view of the threading lathe of FIG. 4, showing a tubular workpiece seated in the work holder and static and thread milling tool supported by the tool platform in the static tool holder and milling tool holder, respectively.
Figure 10:
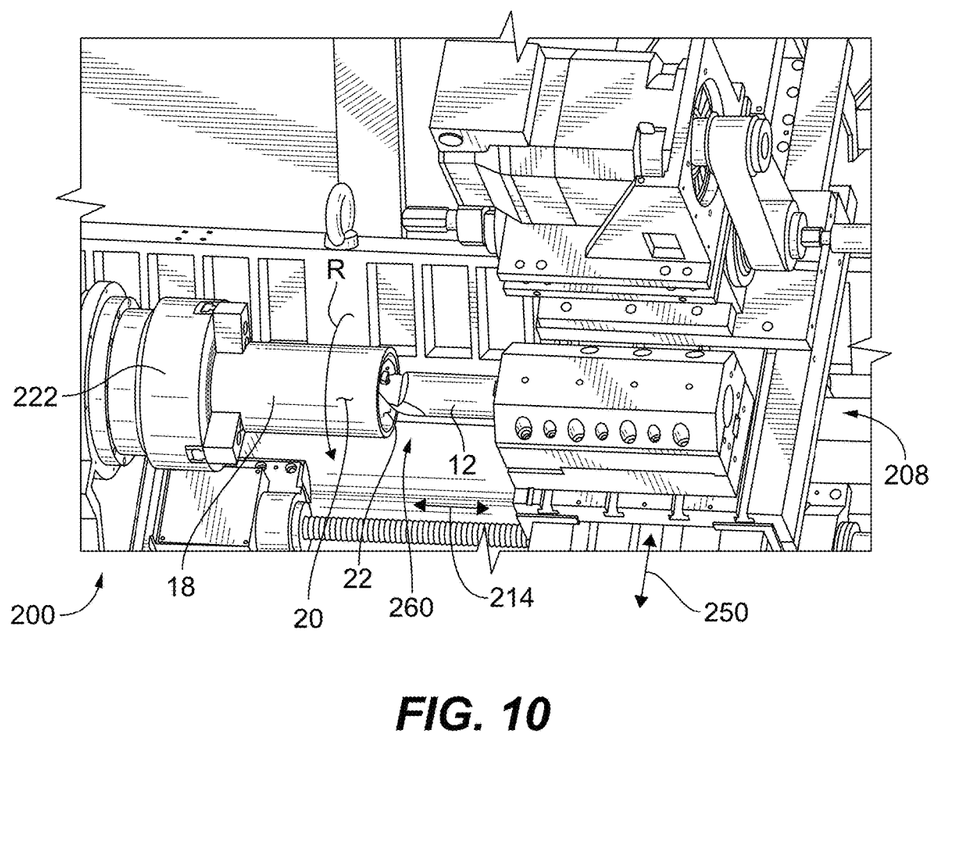
FIG. 10 is a partial perspective view of the threading lathe of FIG. 4, showing the static tool position against the tubular workpiece and removing material from the tubular workpiece.
Figure 11:
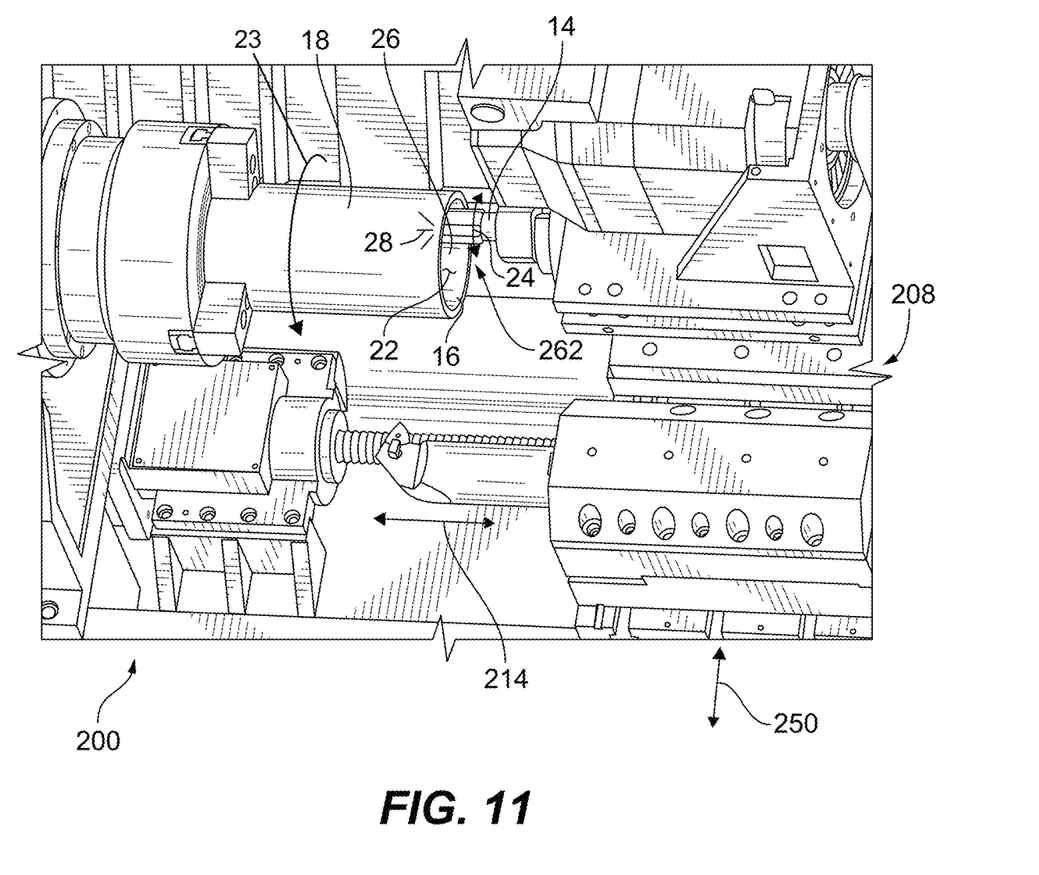
FIG. 11 is a partial perspective view of the threading lathe of FIG. 4, showing the thread milling tool cutting threads on an interior surface of the tubular workpiece.

With reference to FIGS. 9-11, CNC threading lathe 200 is shown cutting threads on an exemplary workpiece, e.g., a coupling workpiece 18. Referring to FIG. 9, coupling workpiece 18 is seated within work holder 222 and fixed therein by chuck teeth 224. Fixation within work holder 222 by chuck teeth 224 is such that both an exterior surface 20 and an interior surface 22 of coupling workpiece 18 are accessible to static tool 12 and thread milling tool 14. Tooling assembly end 212 is shown displaced along z-axis 214 and x-axis 250 relative to turning position 260 (shown in FIG. 10) and milling position 262 (shown in FIG. 11). Coupling workpiece 18 is rotated, indicated by rotary arrow R.

Referring now to FIG. 10, tooling assembly 208 is shown in turning position 260. Tooling assembly 208 displaces relative z-axis 214 and/or x-axis 250 to arrive at turning position 260 by operation of either (or both) work beam drive 244 and tool platform drive 254. Once in turning position 260 static tool 12 is positioned against coupling workpiece 18, allowing static tool to remove material from a surface of coupling workpiece 18 in a turning operation.

As will be appreciated by those of skill in the art in view of the present disclosure, static tool 12 is rotationally fixed relative to coupling workpiece 18. Being rotationally fixed relative to coupling workpiece 18, rotational movement of coupling workpiece 18 relative to static tool 12 causes static tool 12 to remove material (e.g., a stringer-type chip) from a surface of coupling workpiece 18. As static tool 12 advances into the interior of coupling workpiece 18 the stringer (or stringer mass) is displaced toward work holder 222, such as during formation of a bevel on the end of coupling workpiece 18 and/or during skinning of coupling workpiece 18 interior surface 22. In the illustrated exemplary embodiment static tool is shown removing material from interior surface 22, tooling assembly 208 progressively advancing along z-axis 214 toward work holder 222 to skin interior surface 22 of coupling workpiece 18.

Once the turning operation is complete tooling assembly 208 is then displaced relative z-axis 214 and/or x-axis 250 by operation of either (or both) work beam drive 244 and tool platform drive 254 to milling position 262. In milling position 262 thread milling tool 14 is positioned against interior surface 22 of coupling workpiece 18 to mill threads 16 on in interior surface 22 of coupling workpiece 18.

Referring to FIG. 11, tooling assembly 208 is shown in milling position 262. Once tooling assembly arrives at milling position 262 milling tool drive 274 rotates thread milling tool 14 relative to coupling workpiece 18. Rotation of thread milling tool 14 relative to coupling workpiece 18, shown by arrow 24, causes thread milling tool 14 to mill threads 16 on interior surface 22 of coupling workpiece 18. Chips 28 cut from coupling workpiece 18 are relatively short due to the relatively small radius of milling tool 14, chips 28 being readily removed from coupling workpiece 18 and being less apt (if at all) to form a birds nest within coupling workpiece 18. It is contemplated that the direction of rotation of thread milling tool 14 can be in the same direction as coupling workpiece 18 or in a direction opposite coupling workpiece 18, as indicated by double-headed arrow 24. The pitch of threads 16 can be defined by C-axis manipulation, i.e., via operation of a c-axis drive 152 (shown in FIG. 3), using c-axis control signal F (shown in FIG. 3). Alternatively (or additionally), pitch of threads 16 can be defined by movement of thread milling tool 14 along z-axis 214.

As will be appreciated by those of skill in the art in view of the present disclosure, the relatively small diameter of thread milling tool 14 cause chips 28 removed from coupling workpiece 18 to be relatively short in the length. Being relatively short, chips 28 are less likely to aggregate as a mass within the interior of workpiece coupling 18 to form a birds nest, and are amendable to removal as generated. This reduces (or eliminates entirely) the tendency of material removed during thread-cutting operation to form a bird nest within coupling workpiece 18, the associated hazard posed to the operator, and the potential risk to damage to freshly cut threads 16 by clearing the material removed from interior surface 22.

Figure 12:
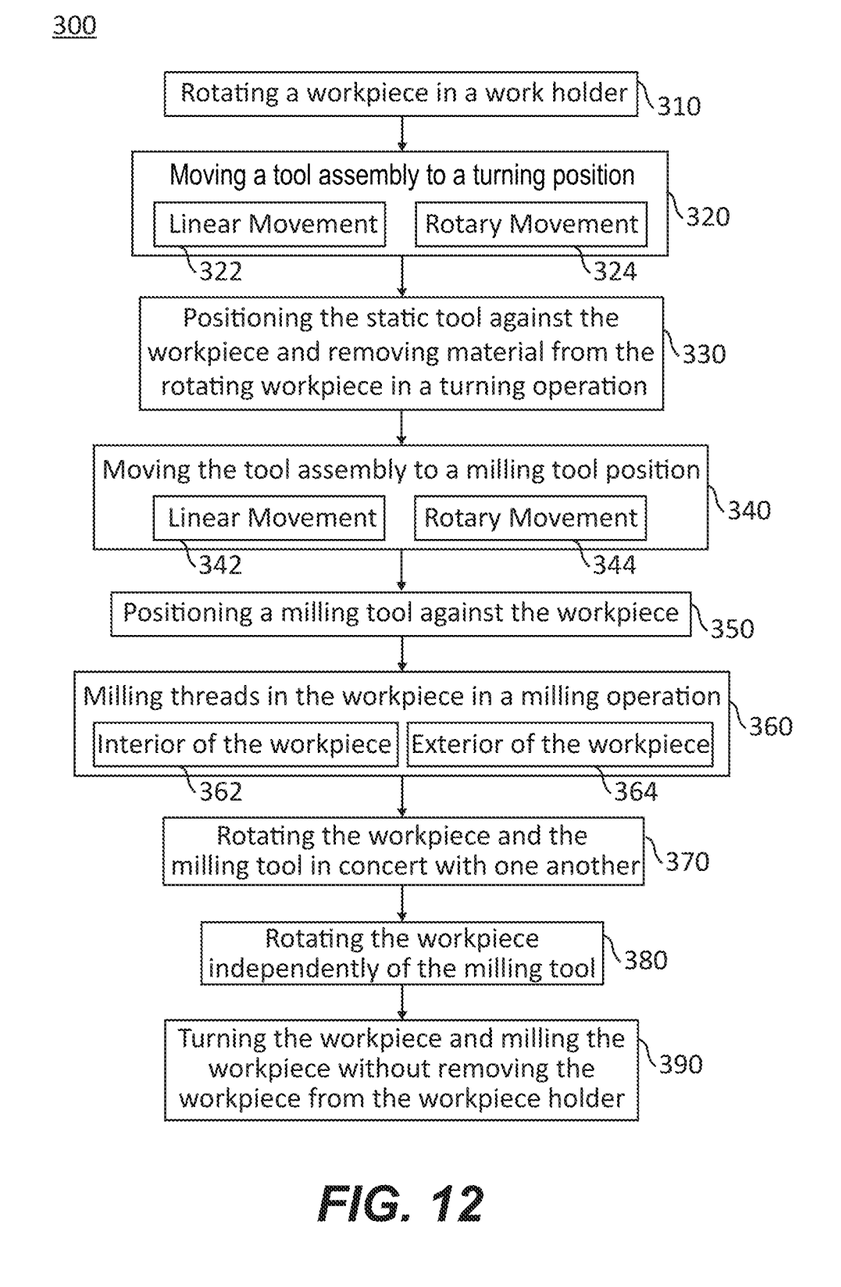
FIG. 12 is a block diagram of a method of milling threads on a workpiece using a threading lathe, showing operations of the method.

With reference to FIG. 12, a method 300 of milling threads in a workpiece, e.g., threads 16 (shown in FIG. 2) in workpiece 10 (shown in FIG. 2), is shown. Method 300 includes rotating the workpiece in a work holder, e.g., work holder 112 (shown in FIG. 2), as shown with box 310. A tool assembly, e.g., tooling assembly 110 (shown in FIG. 2) is moved to a turning position, e.g., turning position 260 (shown in FIG. 10), as shown with box 320. Material is then removed from the workpiece in a turning operation, as shown with box 330. It is contemplated that the tool assembly can be moved to the turning position in a linear movement, e.g., by displacement of tool platform 264 (shown in FIG. 7), as shown with box 322. It is also contemplated that the tool assembly can be moved to the turning position using a rotary movement, e.g., using a turret 408 (shown in FIG. 3), as shown with box 324.

Once the turning operation is complete tool assembly is moved to a milling position, as shown with box 340. Moving the tool assembly from the turning position to the milling can include moving the tool assembly in a linear movement, such as with tool platform 263 (shown in FIG. 7), as shown with box 342. Moving the tool assembly from the turning position to the milling can include moving the tool assembly in a rotary movement, such as with turret 408 (shown in FIG. 3), as shown with box 344. Movement to the turning position positions the thread milling tool against the surface of the workpiece for milling threads on the surface of the workpiece, as shown with box 350. The thread milling then mills threads in the surface of the workpiece in a milling operation, as shown with box 360. The threads can be milled on an interior surface and/or an exterior surface of the workpiece, as shown with boxes 362 and 364.

It is contemplated that milling threads on the workpiece surface can include rotating the workpiece in concert with a milling tool, e.g., thread milling tool 14 (shown in FIG. 2), as shown with box 370. The workpiece can be rotated independently of the milling tool, as shown with box 380. In certain embodiments the workpiece can be turned and milled without removing the workpiece from the work holder, as shown with box 390.

The systems and methods of the present disclosure allow for milling threads on tubular workpieces using a tooling assembly for a CNC threading lathe without generating long cuttings chips or generating obstructions such as "bird nests" while cutting interior or exterior diameters of couplings, pipes and tubes. Such an arrangement allows work that typically requires a lathe, such as edge smoothing, diameter tapering, beveling, and the like, to be performed using the same lathe machine that is used to cut threads on couplings, pipes, tubes, and other workpieces. This one-stop machining process can result in significant savings in time, costs, and complexity, as well as other advantages by virtue of the workpieces being able to remain on the same lathe machine throughout the process until completion. The systems and methods of the present disclosure are particularly applicable to CNC lathe machines that have C-axis control capability, thereby enabling precise and intricate control of the rotation of the workpiece in terms of rotational speed, direction, and degree. Accordingly, the present disclosure greatly improves safety and efficiency of cutting threads on couplings, pipe and tubes.

Although the figures depict embodiments of the present disclosure in a particular orientation, it should be understood by those skilled in the art that embodiments of the present disclosure are well suited for use in a variety of orientations. For example, though thread-milling is shown in the illustrated exemplary embodiment on an interior surface of a coupling, it is to be understood and appreciated that threads can also be milled on the exterior surfaces of couplings and/or pipes, as appropriate for an intended application. Further, it should be understood by those skilled in the art that the use of directional terms such as above, below, upper, lower, upward, downward and the like are used in relation to the illustrative embodiments as they are depicted in the figures, the upward direction being toward the top of the corresponding figure and the downward direction being toward the bottom of the corresponding figure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning.

The invention claimed is:

1. A method of milling threads on a workpiece using a computer numerical controlled (CNC) lathe machine, the method comprising:
    mounting a tool platform on the CNC lathe machine, the tool platform operable to perform a turning operation by positioning a static tool against a surface of the workpiece;
    performing the turning operation by rotating the workpiece with the static tool against the surface of the workpiece, which workpiece is supported in a work holder;
    rotating a thread milling tool supported in a milling tool holder, the milling tool holder fixedly secured to the tool platform; and
    milling threads in the workpiece in a milling operation using the thread milling tool while rotating the workpiece supported in the work holder.

2. The method as recited in claim 1, further comprising:
    adjusting the tool platform from a milling position to a turning position;
    removing material from the workpiece in the turning operation; and
    adjusting the tool platform from the turning position to the milling position.

3. The method as recited in claim 2, wherein adjusting the tool platform from the milling position to the turning position includes moving the tool platform in a linear movement.

4. The method as recited in claim 2, wherein moving the tool platform between the milling position and the turning position includes moving the tool platform in a rotary movement.

5. The method as recited in claim 1, wherein the workpiece is configured to remain supported in the work holder between a beginning of the turning operation and an end of a thread milling operation.

6. The method as recited in claim 1, further comprising rotating the workpiece independently of rotating the thread milling tool.

* * * * *